A. H. PEYCKE.
BRAKE SUPPORTING ARRANGEMENT.
APPLICATION FILED APR. 22, 1918.
1,323,314.
Patented Dec. 2, 1919.
2 SHEETS—SHEET 1.
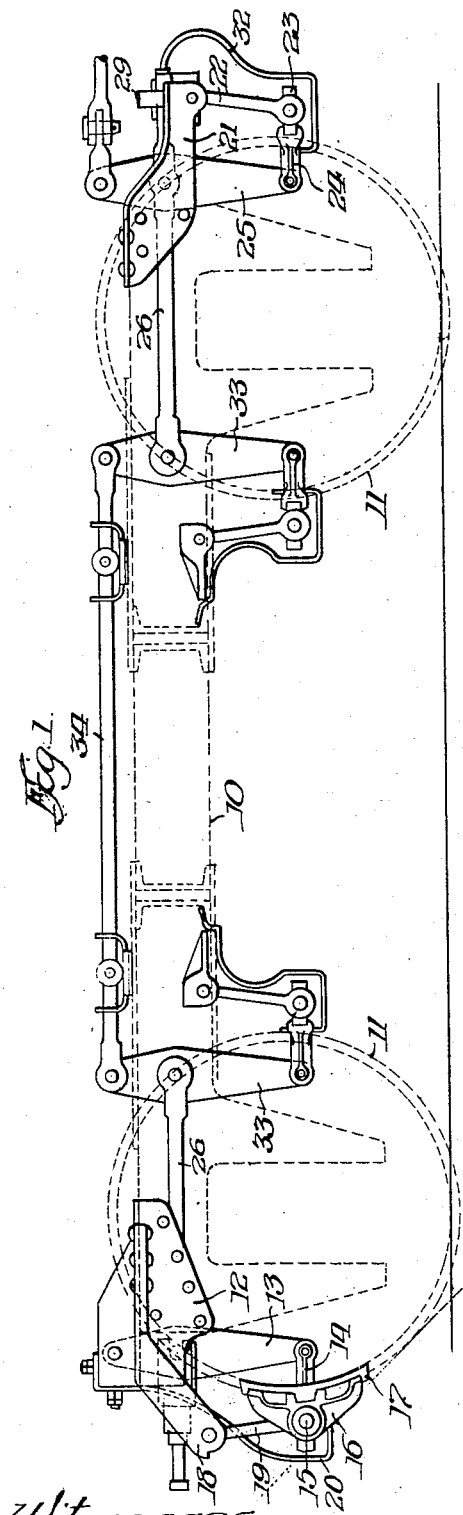
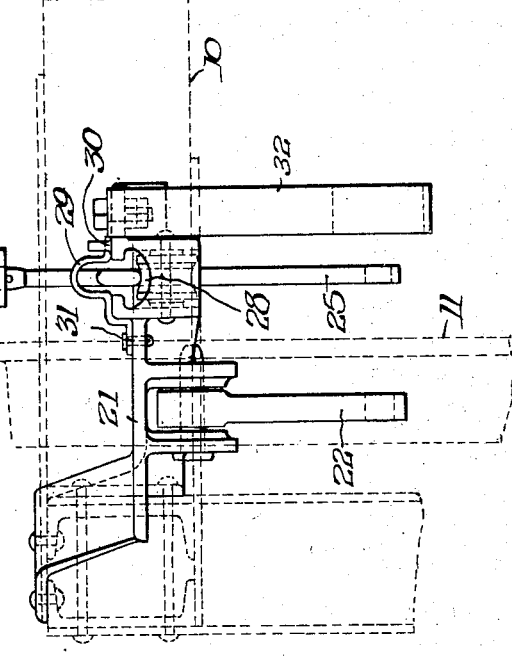
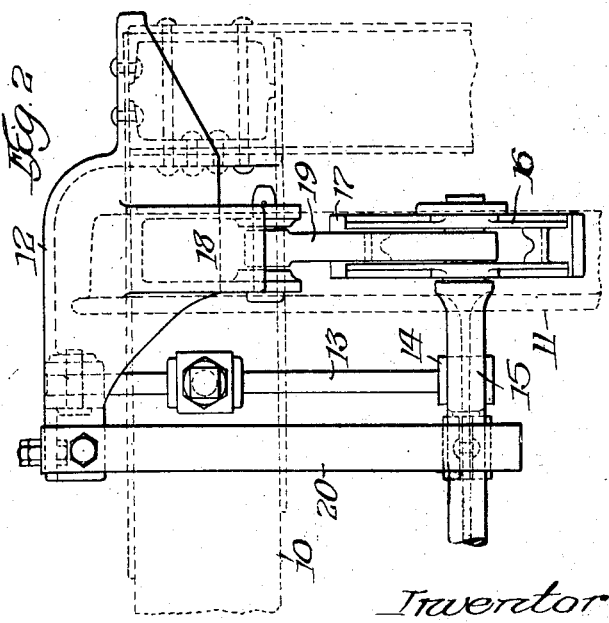
Inventor:
Armand H. Peycke

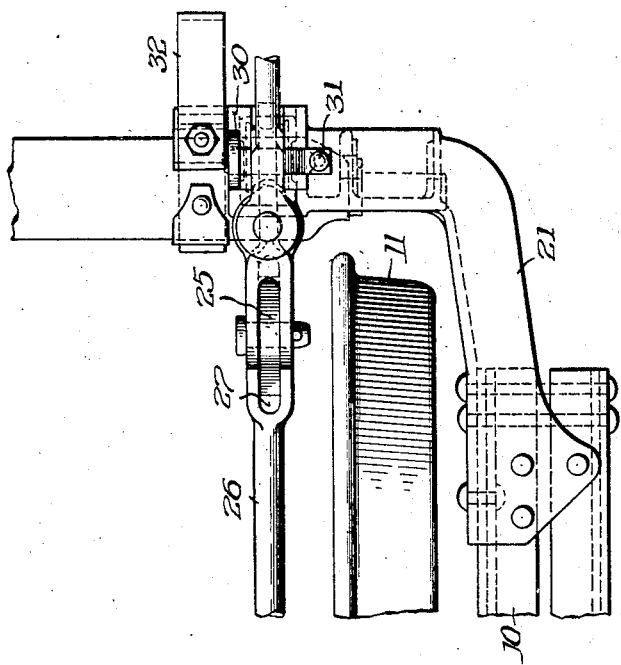
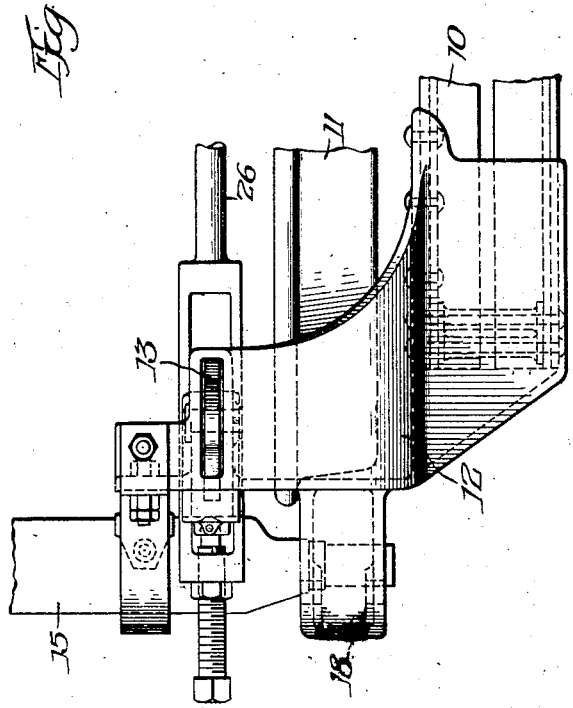

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE-SUPPORTING ARRANGEMENT.

1,323,314.   Specification of Letters Patent.   Patented Dec. 2, 1919.

Application filed April 22, 1918. Serial No. 229,932.

*To all whom it may concern:*

Be it known that I, ARMAND H. PEYCKE, a citizen of the United States, and resident of Chicago, in the county of Cook and State of Illinois, have invented certain new and useful Improvements in Brake-Supporting Arrangements, of which the following is a specification.

This invention relates to brake supporting arrangement.

One of the objects of this invention is to simplify and improve supporting means for brake mechanism.

Another object is to provide brake supporting mechanism, novel in construction and arrangement, adapted to meet the requirements for successful operation.

These and other objects are accomplished by means of the mechanism disclosed on the accompanying sheets of drawings, in which—

Figure 1 is a fragmentary side elevation of a railway car truck embodying my invention.

Fig. 2 is a fragmentary end elevation of one end of the truck showing my improved brake supporting means at the dead lever end of the truck.

Fig. 3 is a fragmentary end elevation of the brake supporting mechanism at the live lever end of the truck, and Fig. 4 is a fragmentary plan view of the arrangement disclosed in Fig. 1.

The various novel features of my invention will be apparent from the following description and drawings and will be particularly pointed out in the appended claims.

Referring to the figures of the drawings, it will be noted I have shown a railway car truck including a side frame 10 supported by wheels 11. Secured to the dead lever end of the truck and more particularly to the corner thereof, is a casting or bracket 12 having an inwardly extending portion which extends around in back of the associated wheel 11. Pivotally connected to one portion of this bracket 12 is the upper end of a brake lever 13, the lower end of which is pivotally connected to a fulcrum 14, secured to a brake beam 15 upon the opposite ends of which are mounted brake heads 16, carrying shoes 17, which engage the braking surface of the associated wheels 11. While I have shown but one side of the truck, it will be appreciated that the equipment, including the brake levers, is the same on both sides. Pivotally connected to a downwardly and outwardly extending portion 18 of the bracket 12 is a brake hanger 19, the lower end of which is pivotally connected to the brake head 16. Also connected to the bracket at the inner end thereof, is a release spring 20, which loops around under the brake beam and is operatively connected therewith for giving the brake head, hanger and lever a releasing movement when the braking effort is discontinued. By means of the arrangement disclosed at the dead lever end of the truck, it will be noted that the coöperating brake lever, brake hanger and release spring are all connected to the bracket 12 which is connected to the side frame 11.

At the live lever end of the truck, I have shown a modified form of bracket 21 to which is pivotally connected a hanger 22, the lower end of which is operatively connected to a brake beam 23 having a fulcrum 24 pivotally connected to the lower end of the brake lever 25. This brake lever is pivotally connected to an intermediate pull rod 26 and preferably extends through an aperture 27 therein. The outer end of this intermediate pull rod 26 is mounted upon a roller 28 which is rotatably mounted in a lateral extending portion of the bracket 21. By means of this arrangement the intermediate pull rod 26 and brake lever and other associated parts may have a free longitudinal movement with the minimum wearing of the parts. At the same time pull rod 26 being supported on the roller 28 also supports the brake rigging. In order to prevent the pull rod 26 from being displaced from its normal position, I have provided a strap 29, one end of which is received by a loop or pocket portion 30 in the bracket 21, the other end of which strap is pinned to the casting 31. This strap confines the pull rod in place. Also connected to the bracket 21 is a release spring 32, the lower end of which is operatively connected to the brake beam 23 to perform a brake releasing function. It is understood, of course, that the intermediate pull rods are connected to other brake levers 33 which levers also are connected by a top pull rod 34, completing the braking connection on one side of the truck shown.

This brake rigging supporting means taken in the form of the brackets for supporting the brake levers, hangers and releasing springs provides a simple and compact arrangement adapted to meet the requirements of service in an efficient manner.

It is my intention to cover all modifications falling within the spirit and scope of the appended claims.

I claim:

1. In brake mechanism, the combination of a bracket, a brake hanger supported thereby, a brake lever, a pull rod connected to said lever and supported by said bracket, and a release spring connected to said bracket and operatively connected to said lever and hanger.

2. In brake mechanism, the combination of a bracket, a roller mounted thereon, a brake lever, a pull rod connected to said lever and bearing upon said roller, a brake hanger connected to said bracket and operatively connected to said lever, and a release spring connected to said bracket and operatively connected to said lever and hanger.

Signed at Chicago, Illinois, this 11th day of April, 1918.

ARMAND H. PEYCKE.

Witnesses:
 CHAS. L. BYRON,
 C. M. OBERBECK.